US012258793B2

(12) United States Patent
Rosales et al.

(10) Patent No.: US 12,258,793 B2
(45) Date of Patent: Mar. 25, 2025

(54) MOTOR VEHICLE LATCH SEAL

(71) Applicant: Brose Schließsysteme GmbH & Co. Kommanditgesellschaft, Wuppertal (DE)

(72) Inventors: David Rosales, Rochster Hills, MI (US); Deon McGUIRE, Oxford, MI (US); Andrii Levakov, Zubrí (CZ)

(73) Assignee: Brose Schließsysteme GmbH & Co. Kommanditgesellschaft (DE)

( * ) Notice: Subject to any disclaimer, the term of this patent is extended or adjusted under 35 U.S.C. 154(b) by 173 days.

(21) Appl. No.: 17/943,735

(22) Filed: Sep. 13, 2022

(65) Prior Publication Data

US 2024/0084622 A1 Mar. 14, 2024

(51) Int. Cl.

| | |
|---|---|
| ***E05B 85/02*** | (2014.01) |
| ***E05B 77/34*** | (2014.01) |
| ***E05B 79/02*** | (2014.01) |
| *E05B 85/00* | (2014.01) |

(52) U.S. Cl.

CPC .............. *E05B 77/34* (2013.01); *E05B 79/02* (2013.01); *E05B 85/02* (2013.01)

(58) Field of Classification Search

CPC .......... E05B 85/02; E05B 79/02; E05B 77/34; Y10T 292/0894; Y10T 292/20; Y10T 292/228; Y10T 292/62; Y10S 292/53; Y10S 292/54

USPC .......................................................... 220/324

See application file for complete search history.

(56) References Cited

U.S. PATENT DOCUMENTS

| | | | | | |
|---|---|---|---|---|---|
| 684,253 | A * | 10/1901 | Houston | F16J 13/08 | 292/256 |
| 3,072,285 | A * | 1/1963 | Aileo | B64D 17/78 | 206/811 |
| 3,091,487 | A * | 5/1963 | Gallagher | F16B 2/245 | 403/392 |
| 3,420,399 | A * | 1/1969 | Heisler | B65D 45/18 | 292/258 |
| 4,351,390 | A | 9/1982 | Argyle et al. | | |
| 4,556,150 | A * | 12/1985 | Ikumi | F16B 5/0064 | 220/326 |
| 4,664,551 | A | 5/1987 | Poitier | | |

(Continued)

FOREIGN PATENT DOCUMENTS

| | | | | |
|---|---|---|---|---|
| DE | 8113742 U1 * | 8/1981 | | |
| DE | 19808847 A1 * | 9/1999 | E05C 9/004 | |

(Continued)

OTHER PUBLICATIONS

International Search Report for PCT/EP2023/074978, Mail date of Jan. 22, 2024, 6 pages.

(Continued)

*Primary Examiner* — Carlos Lugo

(74) *Attorney, Agent, or Firm* — Dickinson Wright PLLC

(57) ABSTRACT

A latch for use in a motor vehicle. The latch including a first housing member, a second housing member, and a clip. The first housing member including a first edge member, the second housing member including a second edge member. The clip including a first leg and a second leg collectively configured to sandwich the first and second edge members to fix the first housing member to the second housing member.

19 Claims, 4 Drawing Sheets

(56) References Cited

U.S. PATENT DOCUMENTS

| | | | | |
|---|---|---|---|---|
| 5,201,368 | A * | 4/1993 | Kroetsch | F28F 9/0226 165/149 |
| 6,056,335 | A * | 5/2000 | Dietrich | E05B 85/08 292/DIG. 53 |
| 6,753,473 | B2 * | 6/2004 | Barlian | H02B 1/28 174/520 |

FOREIGN PATENT DOCUMENTS

| | | | | |
|---|---|---|---|---|
| FR | 2998604 | A1 * | 5/2014 | E05B 77/34 |
| JP | S5523294 | A | 2/1980 | |
| JP | 2002322944 | A * | 11/2002 | |
| JP | 5966203 | B2 | 8/2016 | |
| JP | 2017141702 | A * | 8/2017 | |
| WO | 2013136955 | A1 | 9/2013 | |

OTHER PUBLICATIONS

Written Opinion for PCT/EP2023/074978, Mail date of Jan. 22, 2024, 9 pages.

* cited by examiner

MOTOR VEHICLE LATCH SEAL

TECHNICAL FIELD

The present disclosure relates to a latch or locking mechanism for use in a motor vehicle.

BACKGROUND

Vehicles include closures secured by latches that latch and lock the closures to the vehicle body when the closure is in a partially closed or fully closed position. Certain latches may be configured to provide a number of functions such as power closing, manual closing or locking, power release or opening, manual release, and cinching. Certain closures, such as tailgates used primarily in pickup trucks or vehicles with cargo beds require two latches to secure the tailgate to the truck bed when the tailgate is in the closed or partially closed position.

SUMMARY

According to one embodiment, a latch for use in a vehicle is provided. The latch may include a first housing member, a second housing member, and a clip. The first housing member may include a first edge member and the second housing member may include a second edge member. The clip may include a first leg and a second leg that may be collectively configured to sandwich the first and second edge members to fix the first housing to the second housing.

According to another embodiment, a latch for use in a vehicle is provided. The latch may include a first housing shell, a second housing shell, and a clip. The first housing shell may include a first peripheral wall that may form an outer periphery of the first housing shell and the second housing shell may include a second peripheral wall that may form an outer periphery of the second housing shell. The clip may include a first leg and a second leg. The first and second legs may be collectively configured to compress the first and second peripheral walls to fix the first housing shell to the second housing shell.

According to yet another embodiment, a method of assembling a vehicle latch is provided. The vehicle latch may include a first housing shell, a second housing shell, and a clip. The method of assembling the vehicle latch may include providing the first housing shell, the first housing shell may include a first peripheral wall that may form an outer periphery of the first housing shell. The method may also include placing a second housing shell, such as a second peripheral wall of the second housing shell on the first peripheral wall of the first housing shell. The method may further include attaching the clip to the first and second housing shells so that the first leg of the clip lies along the first peripheral wall and a second leg of the clip lies along the second peripheral wall.

DETAILED DESCRIPTION

Figure 1:
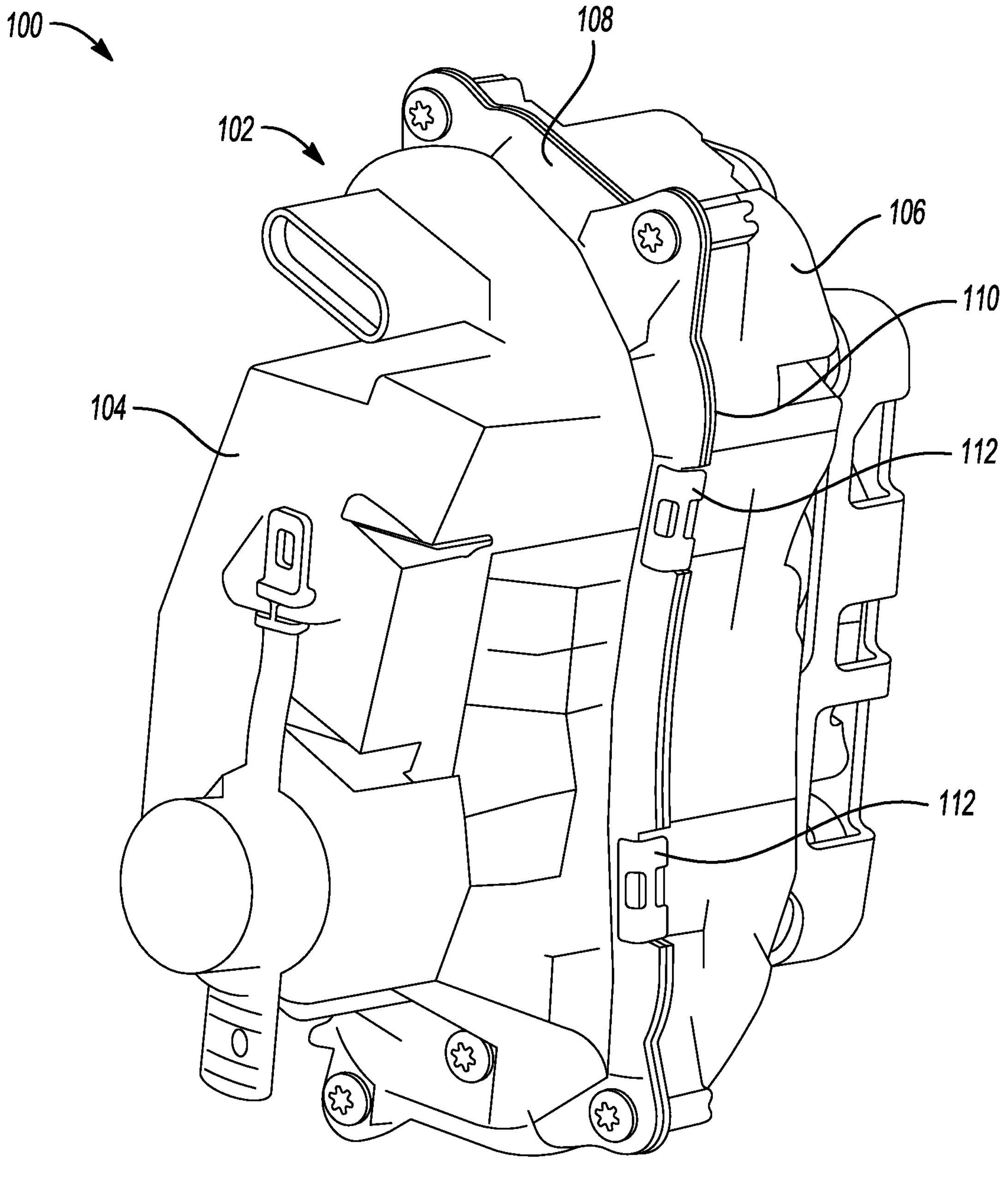
FIG. 1 illustrates a perspective view of an exemplary motor vehicle latch.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form “a,” “an,” and “the” also contemplates plural referents unless the context clearly indicates otherwise. For example, reference to a component means one or more components. The term “substantially” or “about” may be used herein to describe disclosed or claimed embodiments. The term “substantially” or “about” may modify a value or relative characteristic disclosed or claimed in the present disclosure. In such instances, “substantially” or “about” may signify that the value or relative characteristic it modifies is within ±0%, 0.1%, 0.5%, 1%, 2%, 3%, 4%, 5% or 10% of the value or relative characteristic.

Directional terms used herein are made with reference to the views and orientations shown in the exemplary figures. One or more central axes are shown in the figures and described below. Terms such as “outer” and “inner” are relative to the central axis. For example, an “outer” surface means that the surfaces faces away from the central axis, or is outboard of another “inner” surface. Terms such as “radial,” “diameter,” “circumference,” etc. also are relative to the central axis. The terms “front,” “rear,” “upper” and “lower” designate directions in the drawings to which reference is made. The terms, connected, attached, etc., refer to directly or indirectly connected, attached, etc., unless otherwise indicated explicitly or by context.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Motor vehicle latches may include electro-mechanical systems that may include a number of actuators (e.g., motors) configured to actuate latch components (e.g., pawl, catch, release mechanisms) and sensors (e.g., switches) that may be configured to monitor the positions of the latch components. The actuators, latch components, and sensors may be disposed on a housing to protect the internal portions of the latch from water, debris, or some combination thereof. Generally, latch housings may include one or more sections or portions that may be attached (e.g., fastened) to one another by one or more threaded fasteners. The use of threaded fasteners requires investment in certain equipment such as fastener guns, torque monitoring software, and the like. Fastener guns require a predetermined amount of space (e.g., screw head clearance zone) to permit movement of the fastener gun to the location of the fastener. Moreover, because latch housings are generally formed of a polymeric or plastic material, there is a risk of over-torquing the fastener and damaging portions of the latch housing.

The present disclosure attempts to address one or more of the above-mentioned problems.

Figure 2:
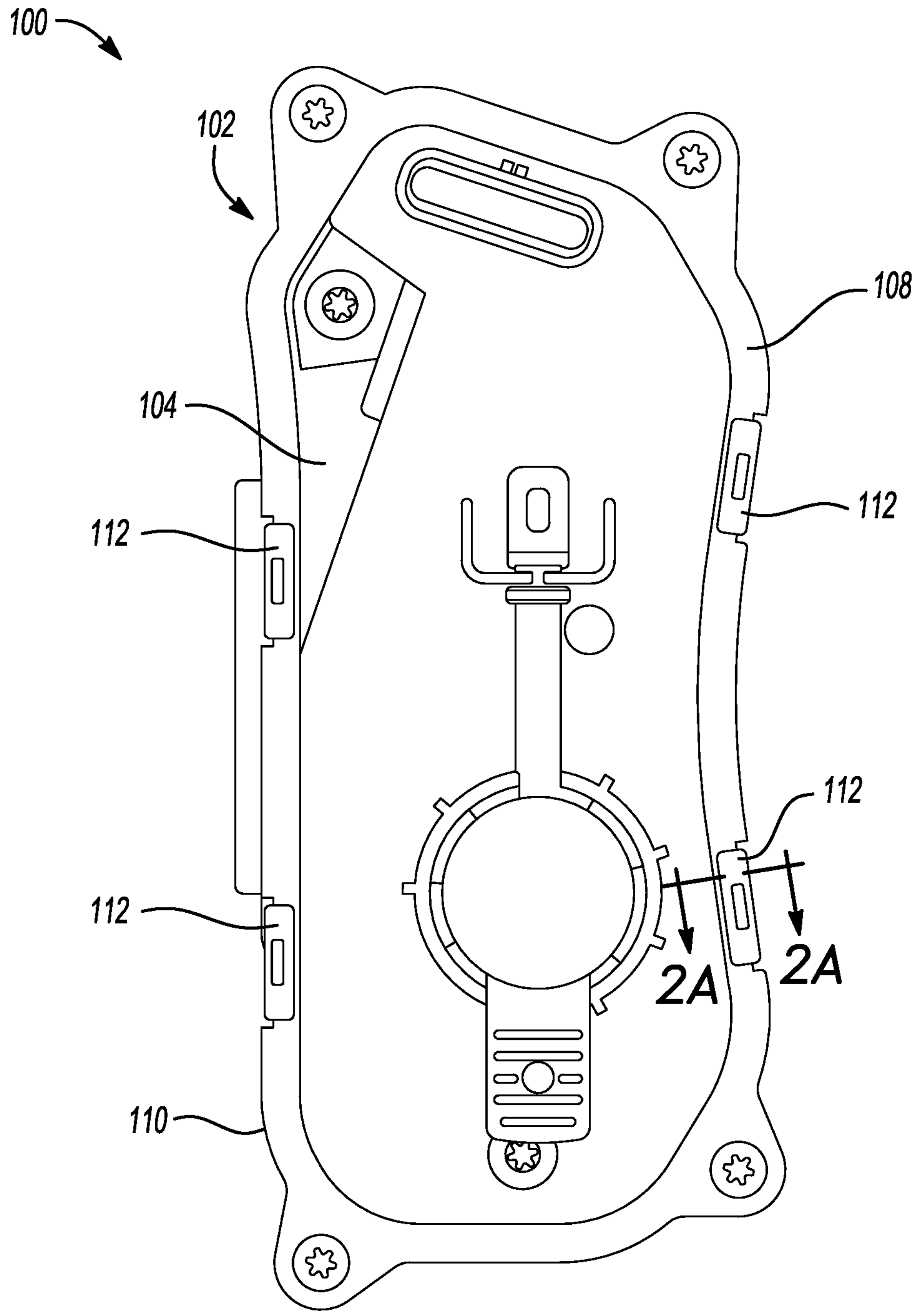
FIG. 2 illustrates a plan view of the motor vehicle latch illustrated in FIG. 1.

FIG. 1 illustrates a perspective view and FIG. 2 illustrates a plan view of an exemplary latch assembly 100. The latch 100 may include a housing 102 that may include a first housing shell 104 and a second housing shell 106. The first housing shell 104 may include a first peripheral wall 108 and the second housing shell 106 may include a second peripheral wall 110 that may be fixed to the first peripheral wall 108. One or more clips 112 may be provided to engage the first and second peripheral walls 108, 110.

Figure 2A:
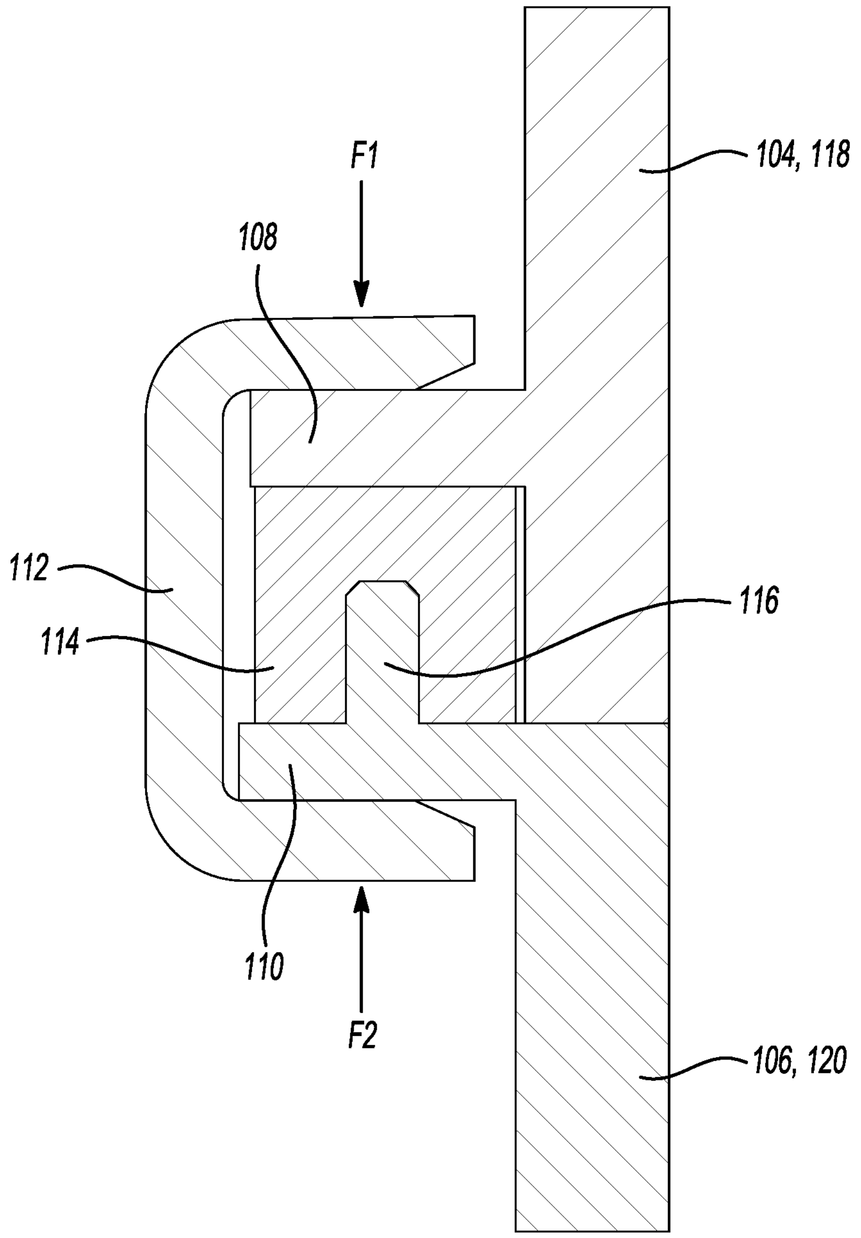
FIG. 2A illustrates a cross-sectional view take along lines 2A in FIG. 2.
Figure 3:
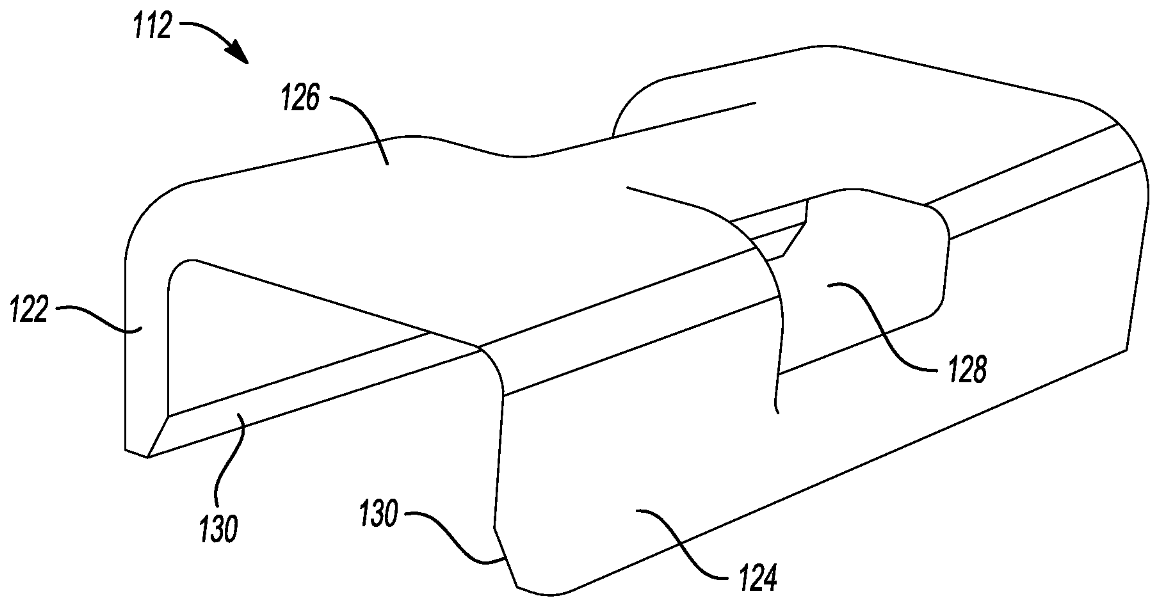
FIG. 3 illustrates a perspective view of an exemplary attachment clip.

FIG. 2A illustrates a cross-sectional view taken along the lines 2A in FIG. 2. FIG. 3 illustrates a perspective view of the clip 112 according to one or more embodiments. The first and second housing shells 104, 106 may include a first sidewall 118 and a second sidewall 120, respectively. As an example, the first and second sidewalls 118, 120 may be substantially aligned with one another when the first housing shell 104 is attached to the second housing shell 106, though in other embodiments the first and second sidewalls 118, 120 may be misaligned or offset from one another.

In one or more embodiments, the first peripheral wall 108 may be arranged substantially orthogonal (e.g., perpendicular) to the first sidewall 118 and the second peripheral wall 110 may be arranged substantially orthogonal (e.g., perpendicular) to the second sidewall 120. As an example, the first peripheral wall 108 may be spaced apart from an end portion of the first sidewall 118 so that the first peripheral wall 108 and the first sidewall 118 form a T-shaped cross-section. The second peripheral wall 110 may extend from a distal end of the second sidewall 120 so that the second peripheral wall 110 and the second sidewall 120 form an L-shaped cross-section.

As an example, a protrusion (e.g., tab, flange, post) may extend from at least one of the first and second peripheral walls (e.g., the second peripheral wall 110). In one or more embodiments, a seal 114 may be disposed between the first and second peripheral walls 108, 110. The seal 114 may be formed of a relatively soft and flexible material such as a thermoplastic elastomer (e.g., Styrene Ethylene Propylene Styrenes (SEPS) Styrene Ethylene-Butene Styrenes (SEBS)) or another material as required. As one example, the seal 114 may be formed by PTS Thermoflex. As another example, a gasket or lay-in-part component may form the seal 114.

The seal 114 and the clip 112 may be configured to provide a waterproof seal. As an example, the waterproof rating may be IP67k or another rating as required.

In one or more embodiments, the clip 112 may include a first leg 122, a second leg 124, and a medial wall 126 that may extend between the first leg 122 and the second leg 124. To fix the first housing shell 104 to the second housing shell 106, the clip 112 may be placed on the first and second peripheral walls 108, 110 so that the first leg 122 of the clip 112 lies along the first peripheral wall 108 and the second leg 124 lies along the second peripheral wall 110, or vice-versa. The first and second legs 122, 124 of the clip 112 may be spaced apart so that when the clip is placed on one or more attachment portions (e.g., the first and second peripheral walls 108, 110) of the first and second housing shells 104, 106, the first and second legs 122, 124 apply forces F1, F2 to the attachment portions (e.g., the first and second peripheral walls 108, 110) of the first and second housing shells 104, 106.

The clip 112 may be formed of one or more alloys or metal material such as spring steel or another suitable material that be configured to apply the first and second forces F1, F2 to the attachment portions (e.g., the first and second peripheral walls 108, 110) of the first and second housing shells 104, 106. In one or more embodiments, distal portions of the first and second legs 122, 124 may be tapered to facilitate placement of the clip 112 on the attachment portions (e.g., the first and second peripheral walls 108, 110) of the first and second housing shells 104, 106.

Figure 4:
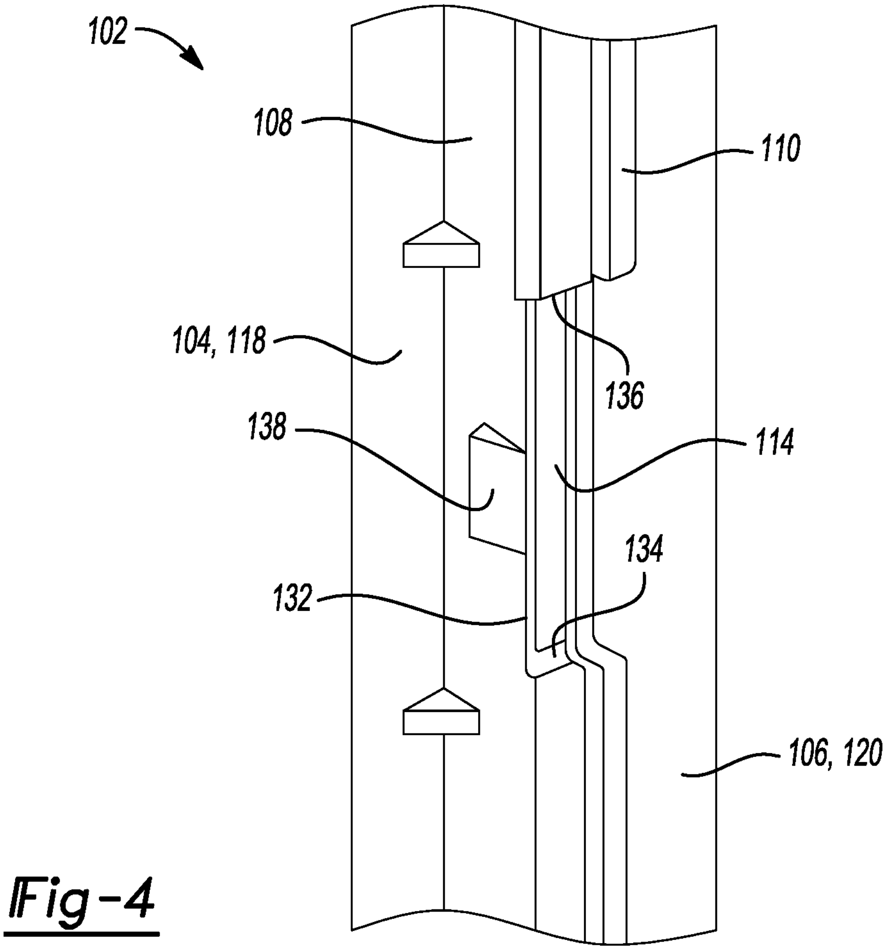
FIG. 4 illustrates a partial-perspective view of a portion of the motor vehicle latch.

FIG. 4 illustrates a perspective view of a portion of the housing 102 without the clip 112. In one or more embodiments, the first and second peripheral walls 108, 110 may each define a recess or a notch collectively referred to herein as recess 132. The recess 132 may include one or more (e.g., two) edges 134, 136 and when the clip 112 is attached to the first and second peripheral walls 108, 110, the clip may be disposed between the edges 134, 136 of the recess 132 formed by the first and second peripheral walls 108, 110. In one or more embodiments, one or more (e.g., both) of the first and second peripheral walls 108, 110 may include a locking member or locating member 138. As an example, the locking member 138 may be formed by an inclined plane, a tab, flange, or another suitable feature. The locking member 138 or locking members 138 may be received by one or more apertures 128 (FIG. 3) defined by one or more portions (e.g., the first and second legs 122, 124 and the medial wall 126) of the clip 112.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

100 latch
102 housing
104 first housing shell
106 second housing shell
108 first peripheral wall
110 second peripheral wall
112 clip
114 seal
116 protrusion
118 first sidewall
120 second sidewall
122 first leg of clip
124 second leg of clip
126 medial wall of clip
128 aperture of clip
130 bevel
132 recess
134 edge
136 edge
138 locking member

What is claimed is:

1. A latch for use in a vehicle, the latch comprising:
a first housing member including a first edge member;
a second housing member including a second edge member; and
a clip including a first leg and a second leg collectively configured to sandwich the first and second edge members to fix the first housing member to the second housing member;
wherein the clip includes a medial wall extending between the first and second legs, the medial wall and the first leg collectively defining an aperture configured to receive a locking member provided in one of the first edge member or the second edge member.

2. The latch of claim 1, further comprising:
a seal extending along at least one of the first and second edge members and disposed between the first and second edge members.

3. The latch of claim 1, wherein the first housing member includes a first sidewall extending in a first direction and the first edge member extends from the first sidewall in a second direction different from the first direction.

4. The latch of claim 3, wherein the second direction is substantially orthogonal to the first direction.

5. The latch of claim 1, wherein a distal portion of at least one of the first and second legs is beveled.

6. The latch of claim 1, wherein the clip is configured to apply a force to the first edge member and the second edge member.

7. The latch of claim 1, wherein the clip is formed of metal.

8. The latch of claim 7, wherein the metal is spring steel.

9. A latch for use in a vehicle, the latch comprising:
a first housing shell including a first peripheral wall forming an outer periphery of the first housing shell;
a second housing shell including a second peripheral wall forming an outer periphery of the second housing shell; and
a clip including a first leg and a second leg collectively configured to compress the first and second peripheral walls to fix the first housing shell to the second housing shell;
wherein the clip includes a medial wall extending between the first and second legs, the medial wall and the first leg collectively defining an aperture configured to receive a locking member extending from the first peripheral wall.

10. The latch of claim 9, wherein the locking member is formed by an inclined plane.

11. The latch of claim 9, wherein the receptacle is formed by an opening collectively defined by the medial wall and the first leg.

12. The latch of claim 9, wherein the first peripheral wall defines a recess provided with inner edges and the clip is disposed between the inner edges of the recess.

13. The latch of claim 9, wherein the medial wall of the clip is substantially aligned with the outer periphery of the first housing shell.

14. The latch of claim 9, further comprising:
a seal extending from at least one of the first peripheral wall and the second peripheral wall, wherein the clip is configured to compress the seal between the first peripheral wall and the second peripheral wall.

15. The latch of claim 14, wherein the other of the at least one of the first peripheral wall and the second peripheral wall includes a protrusion, the protrusion engages the seal.

16. The latch of claim 14, wherein the clip and the seal are collectively configured to form a water-tight seal between the first housing shell and the second housing shell.

17. A method of assembling a vehicle latch, the vehicle latch including a first housing shell, a second housing shell, and a clip, the method comprising:
providing the first housing shell, the first housing shell including a first peripheral wall forming an outer periphery of the first housing shell;
placing a second peripheral wall of the second housing shell on the first peripheral wall of the first housing shell; and
attaching the clip to the first and second housing shells so that a first leg of the clip lies along the first peripheral wall and a second leg of the clip lies along the second peripheral wall;
wherein the clip includes a medial wall extending between the first and second legs, the medial wall and the first leg collectively defining an aperture configured to receive a locking member extending from the first peripheral wall.

18. The method of claim 17, further comprising:
forming a seal along at least one of the first peripheral wall and the second peripheral wall, wherein the forming step is performed prior the placing step.

19. The method of claim 18, wherein the attaching step includes compressing, by the first and second legs, the first and second peripheral walls so that the seal is compressed.

* * * * *